United States Patent [19]

Rogers, III et al.

[11] 4,456,312

[45] Jun. 26, 1984

[54] COMBINATION OF ROTARY AND RECTILINEAR BEARING

[75] Inventors: Alfred M. Rogers, III; Frank E. Carter, both of Huntington, N.Y.

[73] Assignee: Thomson Industries, Inc., Manhasset, N.Y.

[21] Appl. No.: 424,259

[22] Filed: Sep. 27, 1982

[51] Int. Cl.³ .............................................. F16C 31/06

[52] U.S. Cl. .................................................... 308/6 C

[58] Field of Search .............. 308/3 A, 3 R, 6 R, 6 A, 308/6 B, 6 C

[56] References Cited

U.S. PATENT DOCUMENTS

| | | | |
|---|---|---|---|
| 3,900,233 | 8/1975 | Thomson | 308/6 C |
| 4,025,128 | 5/1977 | Geffner | 308/6 C |
| 4,372,622 | 2/1983 | Cheek | 308/6 C X |

FOREIGN PATENT DOCUMENTS

| | | | |
|---|---|---|---|
| 596466 | 3/1978 | Switzerland | 308/6 C |
| 597531 | 4/1978 | Switzerland | 308/6 C |

*Primary Examiner*—Stuart S. Levy
*Assistant Examiner*—David Werner
*Attorney, Agent, or Firm*—Morgan, Finnegan, Pine, Foley & Lee

[57] ABSTRACT

A combination linear and rotary anti-friction bearing. The bearing includes a casing within which is mounted a plurality of oblong tracks containing anti-friction balls adapted to engage a shaft and load bearing plates. Assembled to the casing at each terminal end thereof are rotary anti-friction balls mounted between outer and inner cylindrical raceway members so as to provide a linear and rotary bearing. The outer cylindrical members have a diameter slightly larger than the outer diameter of the casing.

5 Claims, 7 Drawing Figures

COMBINATION OF ROTARY AND RECTILINEAR BEARING

BACKGROUND OF THE INVENTION

This invention relates generally to anti-friction bearings and more particularly to an anti-friction bearing adapted for linear and rotary motion.

There are in the prior art many forms of anti-friction bearings for linear motion such as those disclosed in U.S. Pat. Nos. 3,545,826 and 3,900,233.

There are also known in the prior art a number of patents which relate to bearings capable of linear and rotary movement relative to a shaft, examples of which are U.S. Pat. Nos. 3,037,821, 3,582,160, 3,446,540, 3,692,371, 3,751,121 and 4,025,128 and Brisish Pat. No. 896,251.

The prior art patents offer numerous possible arrangements for bearings having linear and rotary movement relative to a shaft, some of which require relatively complex arrangements and stuctures and detailed machining which results in bearings that are difficult and expensive to manufacture and do not operate in a continuous smooth manner.

The present invention provides an anti-friction bearing capable of linear and rotary motion relative to a supporting shaft that solves some of the problems associated with the prior art structures and provides a bearing that is extremely simple in construction, is easily manufactured and is constructed and arranged so that plastic can be used in many places where metal such as steel was previously required. Thus, the present invention provides a relatively simple bearing structure which may be manufactured economically and which will operate in virtually a trouble-free manner.

OBJECTS OF THE INVENTION

In view of the foregoing, it is an object of the invention to provide a new and improved anti-friction bearing capable of linear and rotary motion.

Another object of this invention is to provide a new and improved linear and rotary anti-friction ball bearing which is relatively simple and relatively inexpensive to manufacture.

A still further object of this invention is to provide a new and improved linear and rotary bearing which is particularly adapted to handle relatively large loads.

Another object of this invention is to provide a new and improved linear and rotary bearing which evenly divides the loads to which it is subjected.

Additional objects and advantages of the invention will be set forth in the specification which follows and, in part, will be obvious from the description, the objects and advantages being realized and obtained by means of the parts, instrumentations, methods, apparatus and procedures, particularly pointed out in the appended claims.

BRIEF DESCRIPTION OF THE INVENTION

Briefly described, the present invention relates to a new and improved linear and rotary anti-friction bearing. The bearing includes a casing which positions a plurality of oblong tracks containing ball members around a shaft, which must be capable of motion in both axial and rotary modes, the ball members being adapted to engage the shaft and load bearing plates positioned within the casing. Attached to the casing, at each end thereof, are anti-friction balls located within inner and outer hollow cylindrical members or raceways. The outer cylindrical members are of a slightly larger diameter than the casing for the oblong tracks enabling the bearing to move in linear and rotary directions relative to the shaft.

The invention consists of the novel parts, steps, constructions and improvements shown and described.

The accompanying drawings which are incorporated in and constitute part of the specification illustrate an embodiment of the invention and, together with the description serve to explain the principles of the invention.

IN THE DRAWINGS

DETAILED DESCRIPTION OF THE INVENTION

Figure 1:
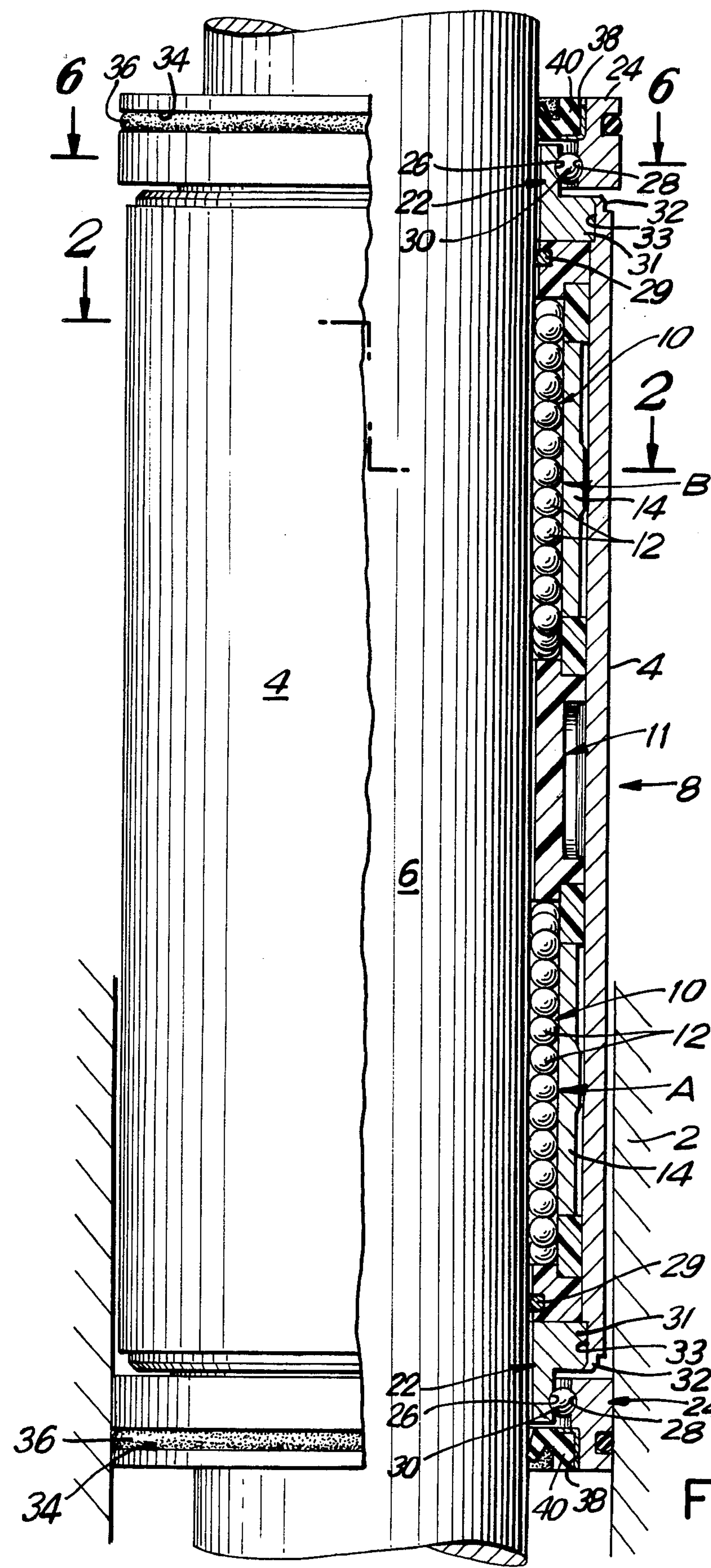
FIG. 1 is a side view of the linear and rotary bearing with a portion partly in section.

A preferred embodiment of the invention is shown in the drawings. The numeral 2 depicts a sleeve or other housing within which may be mounted the linear and rotary bearing having a cylindrical casing 4. The linear and rotary bearing is constructed to withstand the linear and rotary loads of the shaft 6 which is subjected to linear and rotary motion.

Figure 2:
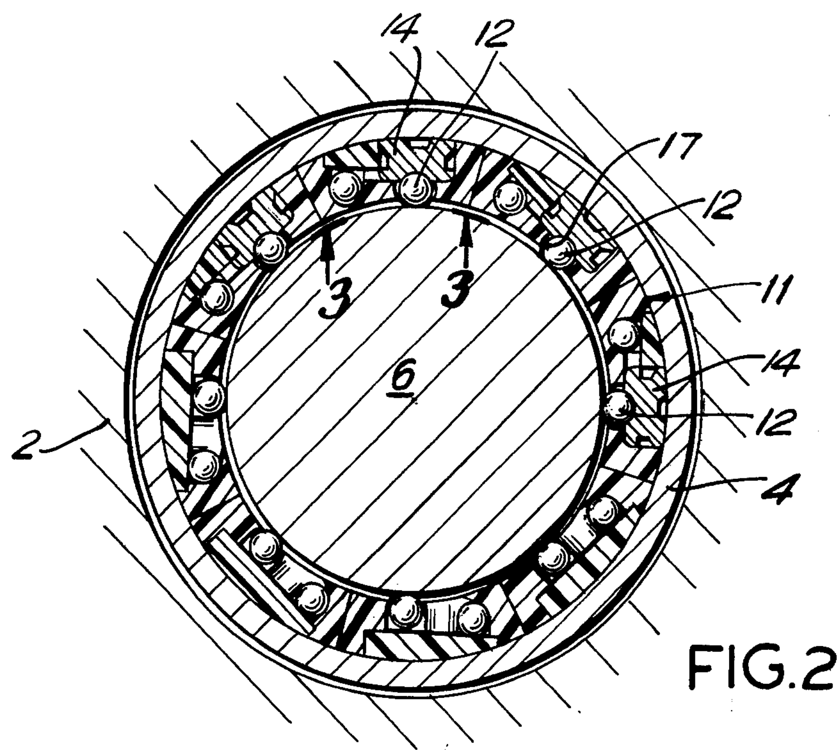
FIG. 2 is a sectional view of the invention taken along line 2—2 of FIG. 1.
Figure 3:
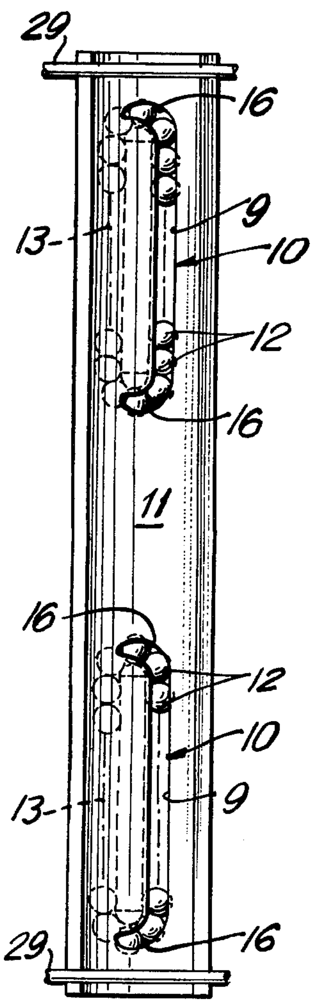
FIG. 3 is a front view taken along line 3—3 of FIG. 2.
Figure 4:
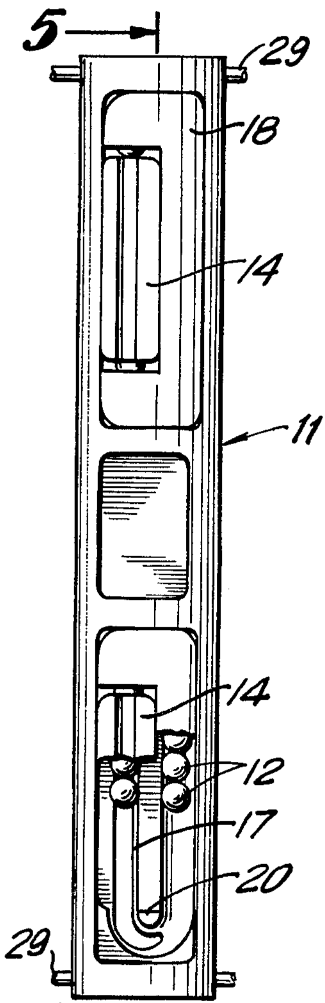
FIG. 4 is a back view of the portion of the invention shown in FIG. 3.
Figure 5:
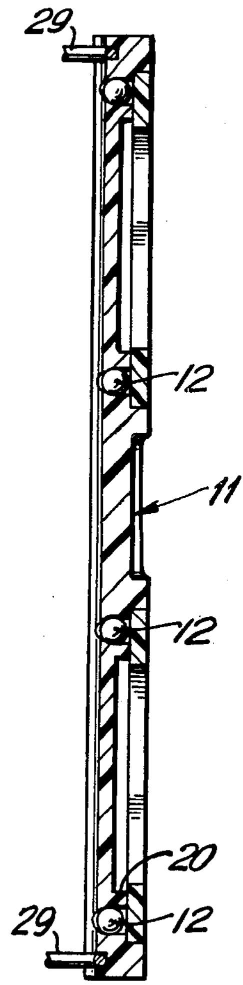
FIG. 5 is a sectional view taken along line 5—5 of FIG. 4.
Figure 6:
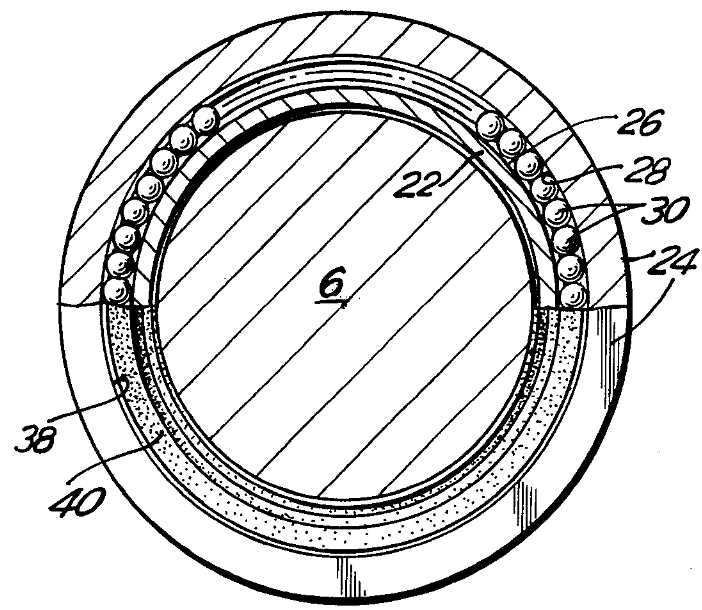
FIG. 6 is a view partially in section taken along line 6—6 of FIG. 1.

The central portion 8 of the bearing is for handling the relative linear motion of the shaft. The linear bearing consists in the embodiment shown of a plurality of oblong raceways 10 in ball retainer segments 11 each of which contains a plurality of anti-friction balls 12 which recirculate through the raceways 10. In the embodiment shown, there are eight such segments. The balls 12 are in direct contact with a load bearing plate 14 and the shaft 6 as shown in FIG. 2 when positioned in one of the straight portions 9 of the raceway 10. There is another straight portion 13 of the raceway where the balls 12 are out of contact with the load bearing plate 14 and the shaft 6. The straight portions 9 and 13 of the raceway are joined by curved raceway portions 16.

The load bearing plate 14 and the balls 12 are retained in position by the retainer cap 18 to retain the balls 12 and the load bearing plate 14 in position.

In the embodiment shown, there are two sets of longitudinally spaced apart raceways A and B. This arrangement permits the use of the invention with relatively long shafts which are subjected to linear and rotary motion. It will be noted that the raceways are positioned around the shaft so that the balls 12 are evenly spaced around the shaft such that the linear forces are evenly distributed. This balancing of the forces is particularly important where exceptionally high forces are involved.

In accordance with the invention, the ball retainer 11 and the retainer cap 18 may be fabricated of resilient, non-metallic material. As an example, these members may be of plastic such as nylon or Delrin or some other similar non-metallic material. Preferably, the materal selected may be produced with low cost, high speed, mass manufacturing methods such as injection molding. The load bearing plate 14, on the other hand, is preferably made of a hard, durable material such as steel.

The bottom of the straight load bearing portion of each raceway is slotted at 17 so that the balls 12 may directly contact the shaft 6 and the load bearing plate 14. The slot, of course, is somewhat narrower than the diameter of the balls 12 and is terminated at the end of the straight run portions with a curved portion 16. When in the "no-load" position the balls 12 do not contact either the shaft or the load bearing plate.

The load bearing plates do not move longitudinally by virtue of the abutments 20 which form part of the ball retainer 11. If desired, each bearing plate 14 may be formed with suitable convex portions as described in U.S. Pat. No. 3,545,826 to provide self-aligning within the bearing relative to movement in the longitudinal directions.

In accordance with this invention, means are also provided to accommodate the rotary motion to which the load bearing shaft is subjected. As embodied, rotary bearing means are positioned at the ends of the cylindrical casing 4.

This means includes an inner hollow cylindrical member 22 and an outer hollow cylindrical member 24. The inner cylindrical member 22 has a groove 26 and the outer cylindrical member 24 has a groove 28. Positioned within the grooves 26 and 28 are a plurality of anti-friction balls 30. Adjacent to the inner cylindrical member are the retainers 11 which have grooves for ring-like springs 29 which maintain the linear bearing assembly in assembled position within the casing.

The inner hollow cylindrical member is fixedly attached by swaging or other means to the cylindrical casing 4. As embodied, the inner cylindrical member 22 includes a radially outwardly extending portion 31 which fits within a groove 33. The terminal end of the casing 4 is swaged at 32 to maintain the inner cylindrical member 22 and the linear bearing casing 4 in engagement. The outer cylindrical member 24 includes a groove 34 in which is positioned an "O" ring 36 which functions as a seal when the linear and rotary bearing is in use.

The outer cylindrical member 24 includes an inner groove 38 in which is mounted a rubber or elastomaric shaft engaging seal member 40. The rubber member 40 is resilient and can be made of a number of different materials. However, by making the shaft engaging member 40 of rubber or some other similar material which is capable of being molded, significant manufacturing cost savings are effected.

Figure 7:
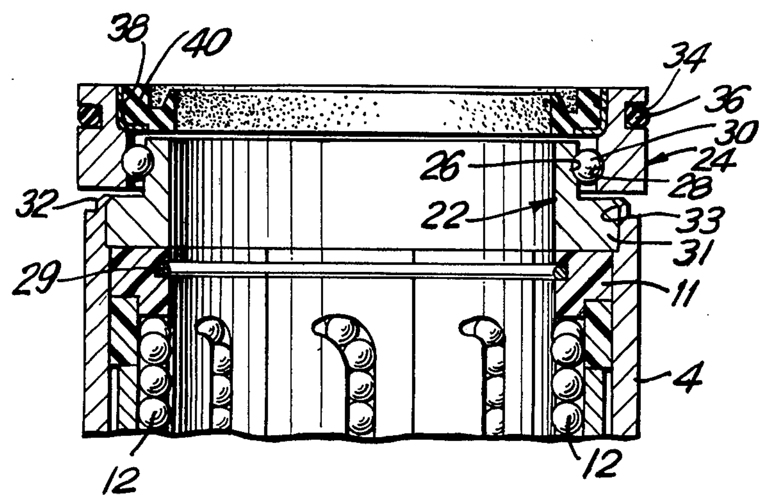
FIG. 7 is a longitudinal section view of the portion of the invention shown in FIG. 6.

It will be noted in FIGS. 1 and 7, for example, that the diameter of the outer cylindrical member 24 is slightly greater than the diameter of the casing 4 which houses the linear bearing portion. The showing in the drawings has been exaggerated for clarity. In some embodiments the difference in the diameter is about 0.030 of an inch.

By virtue of the fact that the outer hollow cylindrical member 24 has a slightly larger diameter than the casing 4, the outer cylindrical member can be attached to a member which is to be moved linearly and rotatively relative to a shaft.

What is claimed is:

1. A linear and rotary bearing adapted for use with a shaft which rotates and moves linearly relative to the bearing, comprising:

(a) a cylindrical casing;
(b) a plurality of closed circuit raceways having a straight track portion containing load carrying balls and a second straight track portion containing non-load carrying balls;
(c) load carrying plates operatively associated with said balls;
(d) hollow cylindrical means operatively associated with both ends of said casing, said hollow cylindrical means including an inner hollow cylindrical member and an outer hollow cylindrical member, said outer cylindrical member having a diameter slightly larger than the diameter of said casing, and
(e) said outer and inner cylindrical members each having grooves in opposed relation one to the other to form a track and anti-friction load bearing balls in said track to form rotary bearings at both ends of said casing.

2. A linear and rotary bearing as defined in claim 1 wherein there is at least one set of closed circuit raceways spaced longitudinally within said casing and along the shaft.

3. A linear and rotary bearing as defined in claim 1 wherein said inner cylindrical member is operatively attached to said casing.

4. A linear and rotary bearing as defined in claim 1 wherein said outer cylindrical member includes a seal member in engagement with the shaft.

5. A linear and rotary bearing adapted for use with a shaft which rotates and moves linearly relative to said bearing, comprising:

(a) a cylindrical casing;
(b) a plurality of closed circuit raceways spaced evenly within said casing and around said shaft, said closed circuit raceways having a straight track portion containing load carrying balls and a straight track portion containing non-load carrying balls;
(c) load carrying plates operatively associated with said balls; and
(d) freely rotating bearing means including anti-friction balls operatively associated with each terminal end of said casing, said bearing means having a diameter slightly larger than the diameter of said casing.

* * * * *